United States Patent

Ostermayer, Jr.

[15] 3,663,893
[45] May 16, 1972

[54] HIGH-EFFICIENCY DIODE-PUMPED LASERS

[72] Inventor: Frederick William Ostermayer, Jr., New Providence, N.J.

[73] Assignee: Bell Telephone Laboratories, Incorporated, Murray Hill, N.J.

[22] Filed: July 13, 1970

[21] Appl. No.: 54,538

[52] U.S. Cl. .......................................... 331/94.5
[51] Int. Cl. ............................................ H01s 3/09
[58] Field of Search ................................... 331/94.5

[56] References Cited

UNITED STATES PATENTS

| | | | |
|---|---|---|---|
| 3,210,688 | 10/1965 | Simpson | 331/94.5 |
| 3,230,474 | 1/1966 | Keck et al. | 331/94.5 |
| 3,284,722 | 11/1966 | Gray | 331/94.5 |
| 3,475,697 | 10/1969 | Griest | 331/94.5 |

OTHER PUBLICATIONS

Ross, Proc. IEEE, 56, (2), Feb. 1968, pp. 196–197

Primary Examiner—Ronald L. Wibert
Assistant Examiner—R. J. Webster
Attorney—R. J. Guenther and Kenneth B. Hamlin

[57] ABSTRACT

Certain practical difficulties are encountered in positioning a pump source comprising very-small-diameter electroluminescent diodes in direct physical contact with an associated laser rod. These difficulties are surmounted by positioning the diodes and the rod in a spaced-apart relationship and imaging the emitting areas of the diodes to positions slightly within the rod. In addition, a major portion of the surface of the rod is coated with a reflective material whereby radiation that enters the rod is multiply reflected therein. In this way the radiant output of the diodes is coupled to the rod in a highly efficient manner by means of a structure that is easily realized.

2 Claims, 6 Drawing Figures

PATENTED MAY 16 1972

INVENTOR
F. W. OSTERMAYER, JR.
BY Lucian C. Canepa
ATTORNEY

HIGH-EFFICIENCY DIODE-PUMPED LASERS

This invention relates to lasers and more particularly to various techniques for achieving a high-efficiency diode-pumped solid-state laser.

BACKGROUND OF THE INVENTION

It is known to employ an array of incoherent electroluminescent diodes to pump a laser rod. Satisfactory operation of such an arrangement depends on efficiently coupling the radiation emitted by the diodes to the rod.

One conventional approach to constructing a diode-pumped laser arrangement involves placing the diodes in contact with the surface of the laser rod. Alternatively, the diodes may be imbedded in the rod. In both of these cases, the close proximity between the diodes and the rod insures that a reasonably high degree of coupling is achieved between the radiant output of the diodes and the absorption states of the rod.

In practice, however, mechanical difficulties have been encountered in mounting very-small-diameter diodes in actual physical contact with an associated laser rod. Accordingly, efforts have been directed at positioning the diodes in a spaced-apart relationship with respect to the laser rod while attempting still to realize the high efficiency advantage of close-proximity coupling.

SUMMARY OF THE INVENTION

An object of the present invention is an improved diode-pumped laser.

More specifically, an object of this invention is a relatively simple diode-pumped laser characterized by high efficiency and ease of fabrication.

Briefly, these and other objects of the present invention are realized in a specific illustrative embodiment thereof in which images of a plurality of diodes are directed by a reflector to the respective positions the diodes would occupy if they were actually mounted in close proximity to an associated laser rod.

In addition, since in practice the diameters of the respective emitting areas of the diodes are typically smaller (by a factor of 2 or 3) than the diameter of the associated rod, the invention also encompasses coating a major portion of the surface area of the rod with a reflective material whereby radiation that enters the rod is multiply reflected therein. Such multiple reflections substantially increase the length of the interaction path that the radiation traverses in the rod. In this way, high-efficiency coupling in a simple mechanically-realizable laser structure is achieved.

In accordance with one specific aspect of the present invention, imaging of the diodes is accomplished with a semi-elliptical cylinder whose concave surface is highly reflective. A linear array of diodes is disposed along one focal line of the cylinder and the laser rod is positioned with its longitudinal axis parallel to and slightly displaced from the other focal line. All but a relatively narrow strip of the rod is coated with a reflective material.

In another illustrative embodiment of this invention, two semi-elliptical cylinders are utilized to image two linear arrays of diodes onto two opposed nonreflective strips of an otherwise reflectively-coated laser rod. In other embodiments, three-dimensional reflectors such as a semi-ellipsoid or a hemisphere are employed to image the diodes onto a laser rod. In each of these last-mentioned embodiments, the laser rod is coated with high-reflectivity material except for discrete areas corresponding to the positions of the diode images. Such large-area coatings enable these structures to exhibit particularly efficient coupling characteristics.

Accordingly, a principal feature of the present invention is that images of pump diodes be directed onto a laser rod whose surface is coated with a material that multiply reflects diode radiation that enters the rod.

BRIEF DESCRIPTION OF THE DRAWING

A complete understanding of the present invention and of the above and other objects, features and advantages thereof may be gained from a consideration of the following detailed description of several illustrative embodiments thereof presented hereinbelow in conjunction with the accompanying drawing, in which.

DETAILED DESCRIPTION

Figure 1:
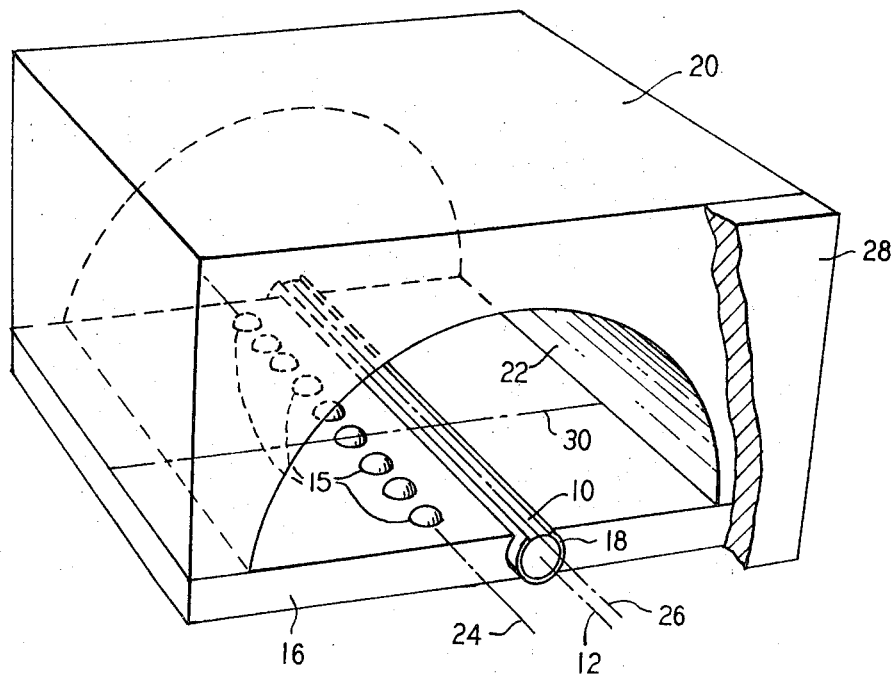
FIG. 1 shows a specific illustrative arrangement made in accordance with the principles of the present invention.

The laser arrangement shown in FIG. 1 includes a conventional laser element 10 which, for example, constitutes a neodymium-containing yttrium aluminum garnet (Nd:YAlG) crystalline element of the type described in J. E. Geusic L. G. Van Uitert U.S. Pat. 3,252,103, issued May 17, 1966. Illustratively, the element 10 is a cylindrical rod (having a longitudinal axis 12) whose ends are flat and parallel to each other or are convex spherical segments whose centers lie on the longitudinal axis 12. If the depicted arrangement is intended to operate as an oscillator, one of the ends of the rod is treated in a known manner to be completely reflective while the other or output end is adapted to be partially reflective (and partially transmissive) to laser radiation incident thereon, or the rod may be placed between external reflectors so treated.

The rod 10 shown in FIG. 1 is optically pumped by an array of electroluminescent diodes 15 disposed in a linear fashion parallel to the aforementioned axis 12. Illustratively, the diodes 15 are commercially-available, dome-shaped, infrared-emitting gallium arsenide phosphide junction devices. In a conventional manner (not shown) each of the diodes 15 is provided with electrodes for connection to a source (not shown) for forward-biasing the diodes to their emitting condition.

Alternatively, the dome-shaped diodes 15 shown in FIG. 1 may be made in accordance with the teachings contained in copending application Ser. No. 816,763, now U.S. Pat. No. 3,593,055, issued July 13, 1971. In accordance with that application, reduced-dome-radius diodes are formed, with the result that the conversion efficiency of the devices for generating infrared radiation is thereby significantly enhanced.

The diodes 15 and the rod 10 of FIG. 1 are mounted in a base plate 16 which is made of any suitable high-heat conductivity material such as copper. By way of illustration, the lower portions of the dome-topped diodes 15 may be positioned in individual receiving cavities (for example, cylindrical holes) formed in the plate 16. Additionally, the rod 10, a substantial portion of whose surface area is covered with a layer 18 whose nature will be specified below, is positioned in a longitudinal slot cut in the plate 16.

Disposed on the plate 16 of FIG. 1 is a metallic block 20, a portion of whose bottom face defines the curved surface of a semi-elliptical cylinder. The curved surface 22 of the block 20 is treated in any of a variety of ways known in the art to be highly specularly reflective to radiation directed thereat by the diodes 15.

Associated with and definitive of the semi-elliptical surface 22 are two focal lines 24 and 26. The line 24 extends through and is approximately centrally located with respect to the emitting areas of the diodes 15. On the other hand the rod 10 is positioned in the plate 16 such that the focal line 26 falls in or near the upper surface of the rod, whereby the longitudinal axis 12 and the line 26 are spaced apart by a distance that approximates the radius of the rod 10.

To form a cavity in which the totality of radiation from the diodes (except for losses incurred on reflection) reaches the associated laser element, the chamber formed by the surface 22 and the plate 16 is capped by end-members positioned in contact with the front and back surfaces of the block 20. Only a portion of the front-end member 28 is shown in FIG. 1. The member 28 contains an opening therethrough (not shown) in registry with the front end of the laser rod 10. Moreover, the back surface of the member 28 is coated to be highly reflective to the radiation emitted by the diodes 15. The back-end member (not shown) is formed and treated in the same way.

In accordance with the principles of the present invention, a semi-elliptical cylinder such as that shown in FIG. 1 is effective to image the diodes 15 to positions slightly within the rod 10. Only half an ellipse is needed to accomplish this because each of the diodes 15 radiates into a hemisphere with approximately a cosine distribution. Therefore, a linear array of diodes radiates into 180° rather than 360°.

Strictly speaking, an ellipse is not an ideal imaging system since only the two foci are stigmatically imaged. A bundle of rays from a point near one focus arrives in the vicinity of the other focus spread out over an area which depends on the respective angles of the rays of the bundle and the eccentricity of the ellipse.

For an ellipse with no refracting surfaces the distance $d'$ of closest approach to the focus of a ray whose distance of closest approach to the other focus is $d$ is given by $$\frac{d'}{d} = \frac{a^2 + f^2 - 2af \cos \theta}{a^2 - f^2}$$

where $a$ is the major axis, $f$ the distance between the foci, and $\theta$ the angle between the ray and the major axis at its starting point. The quantity $d'/d$ is in effect a magnification factor. Since $\theta$ can vary from 0° to 180°, this magnification varies from a minimum of $a-f/a+f$ to a maximum of $a+f/a-f$. This magnification depends only on the eccentricity $e$ ($e = f/a$) of the ellipse and approaches one as the eccentricity approaches zero. The smallest value of $f$ will be determined by the diameters of the diode packages and the laser rod. Increasing $a$ will then decrease the eccentricity.

If one makes the major axis 30 in FIG. 1 sufficiently large so that aberrations due to the noted magnification effect are of the same order of magnitude as the mechanical tolerances of the assemblage, the array of discrete diodes 15 will be imaged approximately in the transverse plane (the plane whose normal is, for example, the focal line 24) and spread along the focal line 26.

In accordance with the principles of this invention, the layer 18 on the surface of the laser rod 10 of FIG. 1 is selected to be highly reflective to radiation provided by the diodes 15. This layer or coating may, for example, comprise a specular or diffuse covering of gold or magnesium oxide. Only a relatively narrow strip at the top of the rod 10 is not so coated. Radiation provided by the diodes 15 enters the rod 10 through this uncoated strip. (Advantageously, an antireflective coating may be applied to the entry strip to reduce reflection losses therefrom.)

Diode-provided radiation that enters the rod 10 of FIG. 1 is multiply reflected therein. Such trapping of the radiation serves to significantly increase the efficiency of coupling between the diode radiation and the absorption states of the rod 10. In one specific illustrative embodiment of the arrangement shown in FIG. 1 wherein the diameters of the emitting areas of the diodes 15 are each approximately 0.020 inches and the diameter of the rod 10 is about 0.060 inches, only one-ninth of the surface area of the rod 10 is not coated with a reflective layer. In that embodiment each incident ray that enters the uncoated strip of the rod makes an average of nine traversals therethrough before exiting from the rod via the uncoated strip.

Figure 2:
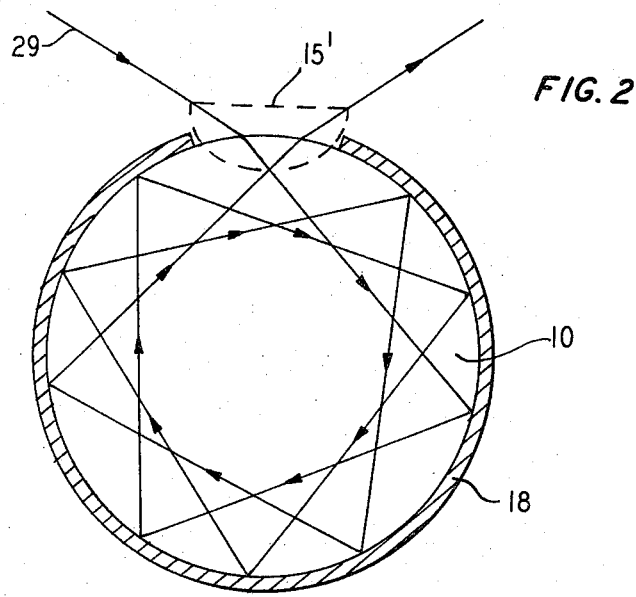
FIG. 2 is an end view of a portion of the FIG. 1 arrangement.

In FIG. 2 the image 15' of the emitting area of one of the diodes 15 is shown in dashed outline positioned slightly within the surface of the laser rod 10. It is apparent that the portion of the surface area of the rod 10 that is not covered by the reflective coating 18 is determined by the relatively small diameter of that emitting area. To illustrate the multiple internal reflections experienced by an entering pump ray as a result of such a large-area coating, one such multiply-reflected ray 29 is represented in FIG. 2.

In the specific embodiment discussed above and shown in FIGS. 1 and 2, nine pump diodes are disposed in a linear array. In that embodiment the laser rod 10 is 2 inches long. The focal lines 24 and 26 are 0.25 inches apart and the major axis 30 is 2.0 inches long.

Figure 3:
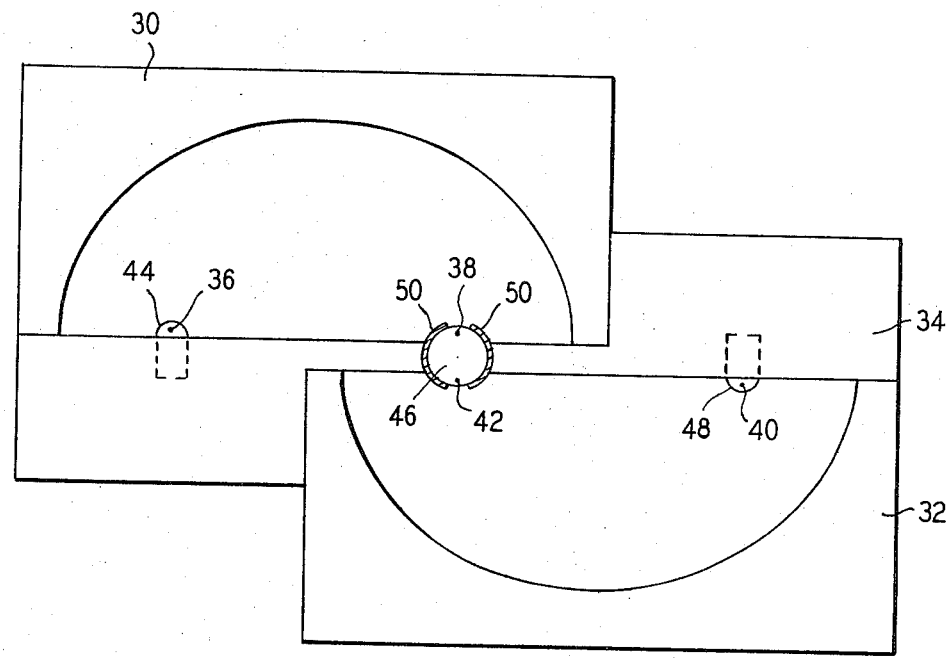
FIG. 3 shows another illustrative embodiment of the principles of this invention.

In accordance with another aspect of the principles of the present invention, a laser rod is pumped in an efficient high-power manner by two linear diode arrays each positioned in a semi-elliptical cylinder in a spaced-apart relationship with respect to the rod. FIG. 3 shows an end view of such an arrangement.

In FIG. 3 two blocks 30 and 32 are mounted on a base plate 34. The focal lines of the semi-elliptical cylinder defined by the block 30 are designated by reference numerals 36 and 38 whereas those associated with the cylinder formed by the block 32 are 40 and 42. A first array 44 of diodes is positioned along the focal line 36 to direct radiation at a nonreflective longitudinal strip on the upper surface of laser rod 46. Similarly, a second array 48 is positioned along the line 40 to direct radiation at a nonreflective strip on the lower surface of the rod. The remainder of the rod 46 is coated with a layer 50 which is highly reflective to diode radiation incident thereon.

Figure 4A:
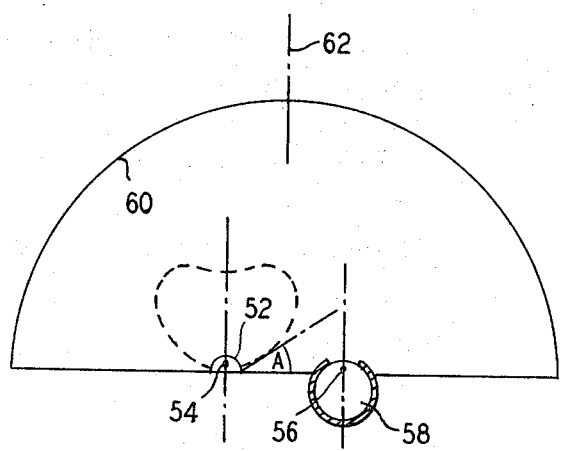
FIG. 4A illustrates the radiation pattern of one of the diodes included in the arrangements shown in FIGS. 1 and 3.

An end view of the three-dimensional radiation pattern of one of the pump diodes included in the arrangements of FIGS. 1 and 3 is represented by dashed lines in FIG. 4A. As is evident from the pattern, a negligible amount of the diode radiation is emitted at relatively small or low angles. Illustratively, the angle A shown in FIG. 4A approximates 20°.

Assume that radiation is emitted from spaced points of the emitting region of diode 52 shown in FIG. 4A. A ray from any such point that is not located on focal line 54 will be directed to a destination point spaced apart from focal line 56. Some of these destination points do not lie on the nonreflective strip of laser rod 58. In other words, some of the radiation emitted by the diode 52 is not directly reflected into the rod 58. This is particularly true of rays emanating from the diode 52 that strike surface 60 to the left of center line 62. Of course, some of this radiation may subsequently impinge on the nonreflective strip of the rod 58 after being multiply reflected from the highly-reflective surfaces of the depicted semi-elliptical cavity. But diode-emitted rays which are not directly reflected by the surface 60 into the rod 58 represent lost pumping power and reduce the overall efficiency of the illustrated structure.

Figure 4B:
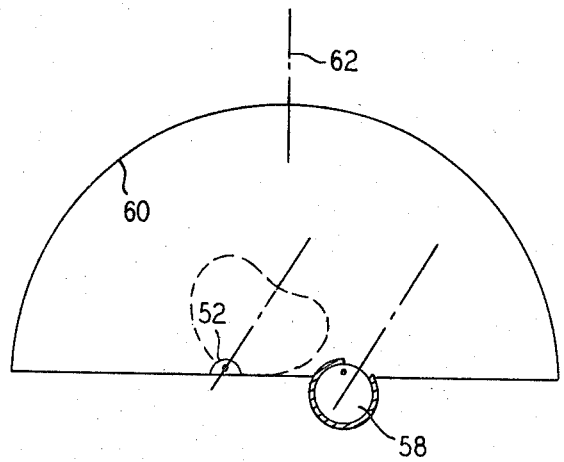
FIG. 4B shows a variant of the arrangements of FIGS. 1 and 3.

In accordance with the principles of the present invention, the arrangement shown in FIG. 4A may be modified in a unique way to increase the percentage of the diode radiation that is directly reflected to the rod 58. In the modified arrangement shown in FIG. 4B, diode 52 is mounted in a clockwise-rotated tilted fashion. Illustratively, the diode (and hence its radiation pattern, too) is tilted approximately A°. Associated rod 58 in FIG. 4B is also tilted in the same direction by the same number of degrees. Accordingly, a relatively large number of the rays emanating from the diode 52 strike the surface 60 in the vicinity of or to the right of center line 62. Because these impact points are closer to the rod 58 than are the corresponding points in FIG. 4A, the earlier-mentioned magnification or spreading effect caused by the semi-elliptical reflective surface is minimized. As a result, in the FIG. 4B arrangement more of these emitted rays are directly reflected to impinge on the nonreflective strip of the rod 58 than in the FIG. 4A structure. In turn, this makes the pumping efficiency of the arrangement shown in FIG. 4B significantly better than that of the FIG. 4A arrangement.

In accordance with the principles of this invention, the aforementioned coupling efficiency can be further enhanced by employing a three-dimensional imaging system to direct diode pump radiation to an associated laser rod. Either a semi-ellipsoidal or a hemispherical reflector may be utilized. In theory, a semi-ellipsoid is preferred because for a given overall physical size the aberrations caused thereby are smaller. But, as a practical matter, a hemisphere is preferred because it can be fabricated more easily and accurately than an ellipsoid. A top view of a specific hemispherical embodiment is shown in FIG. 5.

Figure 5:
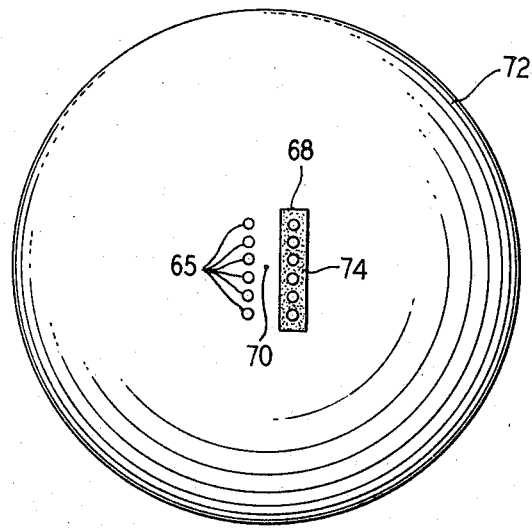
FIG. 5 depicts still another illustrative embodiment made in accordance with the principles of the present invention.

In FIG. 5 a linear array of diodes 65 and a laser rod 68 are positioned parallel to one another and equidistant from the center 70 of hemispherical reflector 72. In an illustrative embodiment in which the diameter of the hemisphere is at least eight times the length of the rod 68, the depicted arrangement is effective to stigmatically image the diodes 65 to discrete positions slightly within the rod 68. Accordingly, except for discrete areas, it is feasible to coat the entire surface of the rod 68 with a high-reflectivity material. Such a coating 74 is indicated in FIG. 5. The large-area coating 74 causes the illustrated embodiment to exhibit a highly advantageous radiation-trapping characteristic. As a result, the depicted structure exhibits a high degree of coupling between the rod 68 and radiation provided by the diodes 65.

Finally, it is to be understood that the above-described arrangements are only illustrative of the application of the principles of the present invention. In accordance with these principles, numerous other arrangements may be devised by those skilled in the art without departing from the spirit and scope of the invention. For example, a cylindrical (or spherical) refracting element on the nonreflective portion(s) of the laser element can be beneficial in collecting and focusing radiation from the associated spaced-apart pump source to form a more intense image within the element. Additionally, although the primary emphasis herein has been directed to the use of relatively-small-diameter electroluminescent diodes to constitute the pump source, the principles of this invention also extend to the use of other relatively-small-diameter elements, for example a lamp filament, as the pump source.

What is claimed is:

1. In combination, a laser element, pump means positioned in a spaced-apart relationship with respect to said element, said pump means having an emitting region whose diameter is 1/Nth that of the diameter of said element, wherein N is a positive number greater than 1, reflecting means responsive to radiation emitted by said pump means for forming an image of said pump means in the direct vicinity of the surface of said element, and means disposed on substantially more than half of the surface area of said laser element for reflecting radiation emitted by said pump means and directed into said element, whereby radiation directed into said element by said pump means is successively reflected to make multiple passes through said element before exiting therefrom, wherein said pump means comprises an array of electroluminescent diodes, each of said diodes having an emitting region whose diameter is 1/Nth that of the diameter of said element, and wherein said pump means further comprises an additional array of electroluminescent diodes positioned in a spaced-apart relationship with respect to said laser element, wherein said means disposed on the surface area of said laser element covers the entire area thereof except for two opposed relatively narrow longitudinal strips each of whose widths approximates said emitting-region diameter, and wherein said reflecting means comprises means defining a distinct semi-elliptical cylinder for each respective array of diodes for directing radiation emitted by one of said arrays onto one of said longitudinal strips and for directing radiation emitted by the other one of said arrays onto the other one of said longitudinal strips.

2. In combination, an active laser element, pump means positioned in a spaced-apart relationship with respect to said element, said pump means having an emitting region whose diameter is 1/Nth that of the diameter of said element, wherein N is a positive number greater than 1, reflecting means responsive to radiation emitted by said pump means for forming an image of said pump means in the direct vicinity of the surface of said element, and means directly disposed on substantially more than half of the surface area of said active laser element for reflecting radiation emitted by said pump means and directed into said element, whereby radiation directed into said element by said pump means is successively reflected to make multiple passes through said element before exiting therefrom, wherein said pump means comprises an array of electroluminescent diodes, each of said diodes having an emitting region whose diameter is 1/Nth that of the diameter of said element, wherein said reflecting means comprises means defining a hemisphere, and wherein said means disposed on the surface area of said laser element covers the entire area thereof except for discrete regions corresponding to respective images of said diodes.

* * * * *